UNITED STATES PATENT OFFICE.

GEORGE T. WALKER, OF MINNEAPOLIS, MINNESOTA, ASSIGNOR, BY MESNE ASSIGNMENTS, TO COLONIAL CHEMICAL CORPORATION, OF MINNEAPOLIS, MINNESOTA, A CORPORATION OF MINNESOTA.

PROCESS OF MAKING GLAUBER'S SALT, TRI-SODIUM PHOSPHATE, AND NEUTRAL SODIUM PHOSPHATE.

1,379,735.     Specification of Letters Patent.     Patented May 31, 1921.

No Drawing.     Application filed April 23, 1918. Serial No. 230,230.

*To all whom it may concern:*

Be it known that I, GEORGE T. WALKER, a citizen of the United States, resident of Minneapolis, county of Hennepin, State of Minnesota, have invented certain new and useful Improvements in Processes of Making Glauber's Salt, Tri-Sodium Phosphate, and Neutral Sodium Phosphate, of which the following is a specification.

The object of my invention is to provide an improved process for making Glauber's salt and tri-sodium phosphate without the use of sulfuric acid generally employed for the purpose.

The invention consists generally in the process hereinafter described and particularly pointed out in the claims.

In carrying out my process, I make a solution of sodium bisulfate and mix it with ground phosphate rock in the proportions necessary for the reaction:

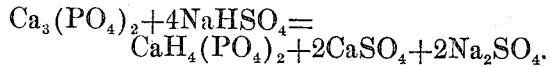

$$Ca_3(PO_4)_2 + 4NaHSO_4 = CaH_4(PO_4)_2 + 2CaSO_4 + 2Na_2SO_4.$$

Add to the solution of acid calcium phosphate soda ash in a quantity sufficient to render the solution neutral to litmus paper. Then filter the mixture and cool to 60 degrees F. The crystals of Glauber's salt may then be removed.

Warm the mother liquor and if tri-sodium phosphate is to be produced add 12% more caustic soda solution than is necessary for the reaction:

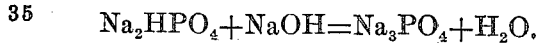

$$Na_2HPO_4 + NaOH = Na_3PO_4 + H_2O.$$

The mixture may then be filtered, if desired. This step may be omitted. Such filtration functions to remove matter believed to be organic and to originate in the phosphate rock and brought out by the preceding reaction. This matter sometimes manifests itself in a slight discoloration of the product, which discoloration is overcome by this step. The next step is to evaporate and cool the mixture to obtain tri-sodium phosphate in the form of crystals;

$$(Na_3PO_4.12H_2O.)$$

I claim as my invention:

1. A process of obtaining Glauber's salt which consists in mixing a solution of sodium bi-sulfate with ground phosphate rock in proportions to produce a solution of acid calcium phosphate and Glauber's salt, adding to such solution sufficient soda ash to render the solution neutral to litmus paper, thereafter filtering the mixture and finally cooling to cause crystallization of the Glauber's salt.

2. A process of obtaining tri-sodium phosphate which consists in mixing a solution of sodium bi-sulfate with ground phosphate rock in proportions to produce a solution of acid calcium phosphate and Glauber's salt, adding to such solution sufficient soda to render the solution neutral to litmus paper thus forming neutral sodium phosphate, thereafter filtering the mixture and cooling to cause crystallization of the Glauber's salt, then removing the formed crystals of Glauber's salt from the solution, thereafter adding an excess of caustic soda solution over the amount theoretically necessary to produce tri-sodium phosphate from the neutral sodium phosphate previously formed and thereafter cooling the mixture.

In witness whereof I have hereunto set my hand this 18th day of April, 1918.

GEORGE T. WALKER.